Figure 10:
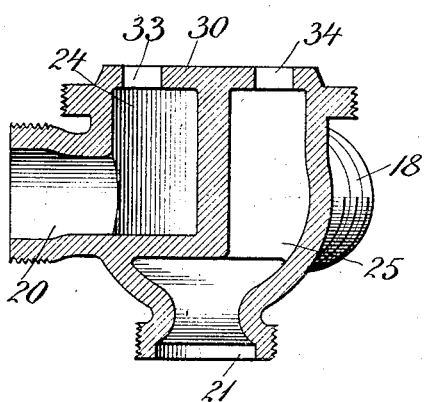

No. 894,280. PATENTED JULY 28, 1908.
T. R. McKNIGHT.
ENGINEER'S VALVE FOR COMPRESSED AIR OPERATED DUMP CARS.
APPLICATION FILED OCT. 12, 1907.
3 SHEETS—SHEET 1.
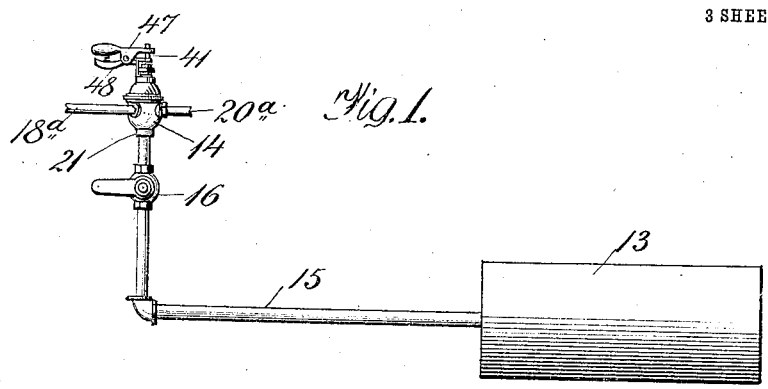
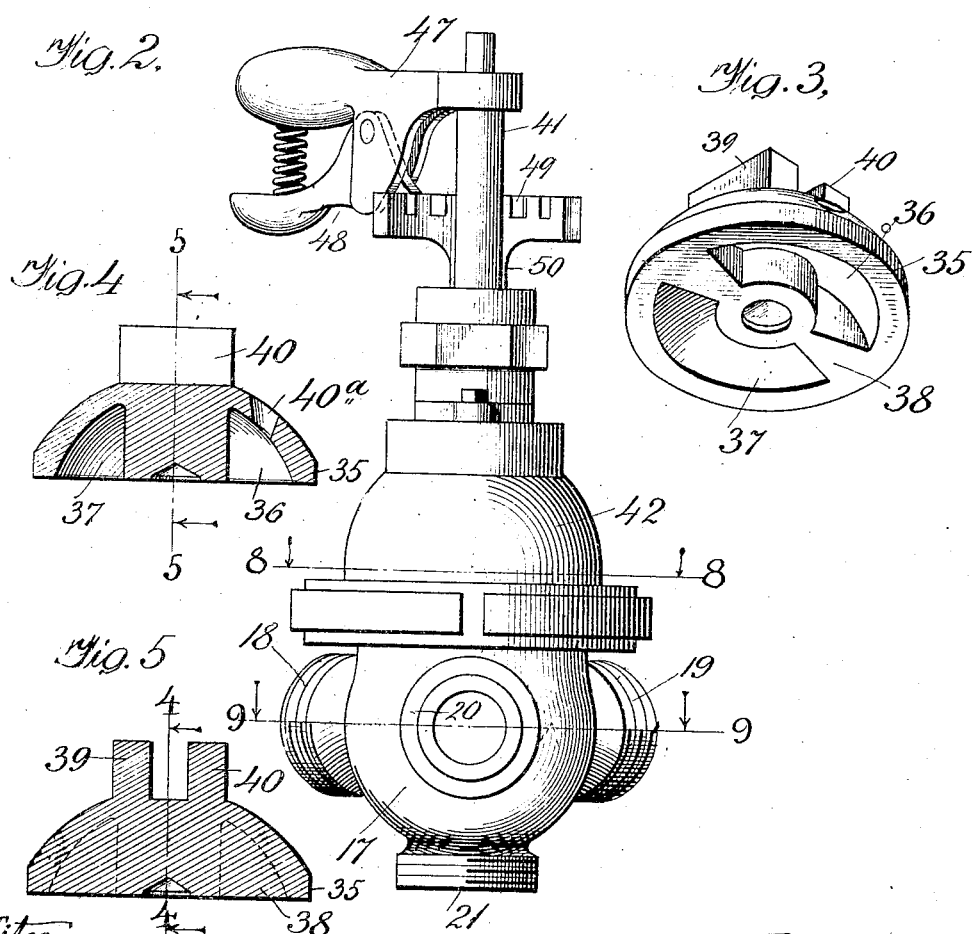

No. 894,280. PATENTED JULY 28, 1908.
T. R. McKNIGHT.
ENGINEER'S VALVE FOR COMPRESSED AIR OPERATED DUMP CARS.
APPLICATION FILED OCT. 12, 1907.
3 SHEETS—SHEET 2.
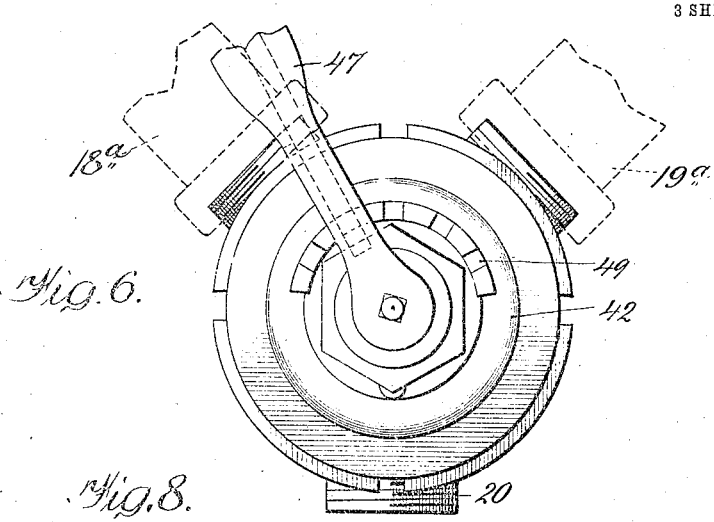
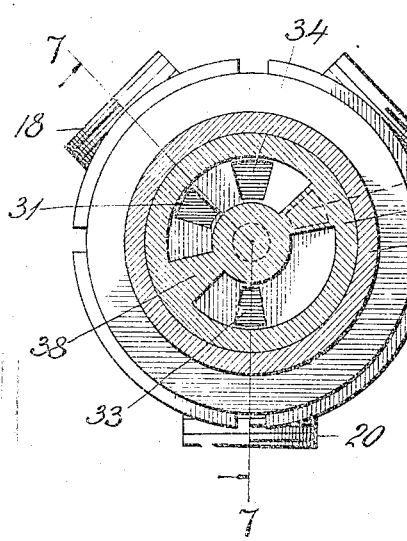
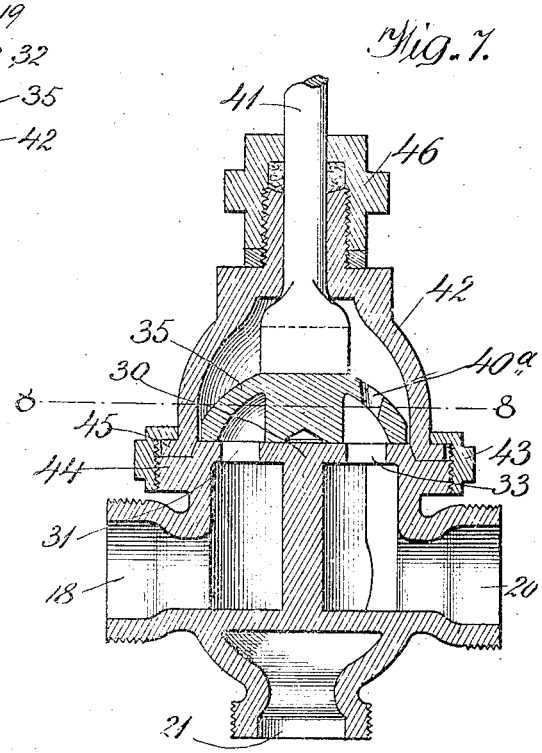

No. 894,280. PATENTED JULY 28, 1908.
T. R. McKNIGHT.
ENGINEER'S VALVE FOR COMPRESSED AIR OPERATED DUMP CARS.
APPLICATION FILED OCT. 12, 1907.

3 SHEETS—SHEET 3.

Witnesses:
G. V. Damarin Jr.
W. H. DeBusk

Inventor:
Thomas R. McKnight
by Bond Adams Pickard Jackson
his Attys.

UNITED STATES PATENT OFFICE.

THOMAS R. McKNIGHT, OF AURORA, ILLINOIS, ASSIGNOR TO WESTERN WHEELED SCRAPER COMPANY, OF AURORA, ILLINOIS, A CORPORATION OF ILLINOIS.

ENGINEER'S VALVE FOR COMPRESSED-AIR-OPERATED DUMP-CARS.

No. 894,250.

Specification of Letters Patent.

Patented July 28, 1908.

Application filed October 12, 1907. Serial No. 397,152.

*To all whom it may concern:*

Be it known that I, THOMAS R. McKNIGHT, a citizen of the United States, residing at Aurora, in the county of Kane and State of Illinois, have invented certain new and useful Improvements in Engineers' Valves for Compressed-Air-Operated Dump-Cars, of which the following is a specification, reference being had to the accompanying drawings.

My invention relates to dump-cars, and particularly to dump-cars arranged to be dumped at one side or the other by means of compressed air, such, for example, as the car illustrated and described in Patent No. 846,501, issued to me March 12, 1907. In cars of this description the dumping is effected by compressed-air-actuated mechanism controlled from the engineer's cab. The air-compressing mechanism of the usual air-brake system is relied upon to furnish compressed air, which is connected with the dumping mechanism of the several cars by train pipes extending from one end of the train to the other,—two train pipes being provided, one for controlling the dumping at one side and the other for controlling the dumping at the other side of the train.

My present invention has to do principally with the valve by which the engineer controls the admission of air to either train pipe or exhausts it therefrom.

It has for its object to provide new and improved valve mechanism by which the engineer may effect the dumping of the car or cars of his train at either side and may effect the desired operations with the consumption of a minimum amount of air. I accomplish this object as illustrated in the drawings and as hereinafter described.

What I regard as new is set forth in the claims.

Figure 9:
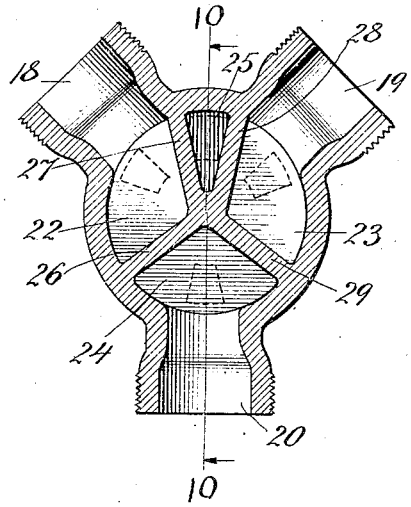
Figure 11:
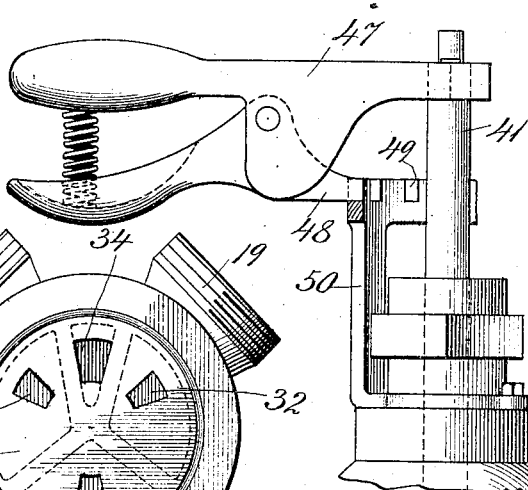
Figure 12:
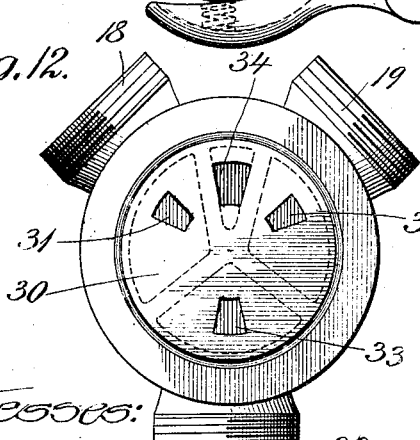

In the accompanying drawings,—Figure 1 is a view, showing the main air reservoir, the engineer's valve and the cut-out valve by which the main reservoir may be cut off from the engineer's valve; Fig. 2 is an enlarged view, showing the engineer's valve with the pipe connections therefor; Fig. 3 is a perspective view of the valve disk; Fig. 4 is a sectional view thereof, being a section taken on line 4—4 of Fig. 5; Fig. 5 is a section on line 5—5 of Fig. 4; Fig. 6 is a plan view of the valve as a whole; Fig. 7 is a vertical section on line 7—7 of Fig. 8; Fig. 8 is a horizontal section on line 8—8 of Fig. 7; Fig 9 is a horizontal section on line 9—9 of Fig. 2; Fig. 10 is a vertical section on line 10—10 of Fig. 9; Fig. 11 is a side elevation of the upper portion of the valve as a whole, the locking bracket being in section; and Fig. 12 is a plan view of the valve body.

Referring to the drawings,—13 indicates a main air-reservoir, which is supplied with compressed air by an independent pump, from the air-brake system of the train, or in any other suitable way.

14 indicates the engineer's valve, which is connected by a pipe 15 with the main reservoir 13, said pipe having a cut-out valve or cock 16 adjacent to the engineer's valve 14, as shown in Fig. 1. The object of the cut-out valve 16 is to cut off the engineer's valve from the main reservoir when desired.

17 indicates the body of the valve, which, as shown in Figs. 6, 8 and 9, is provided with three pipe connections 18—19—20 arranged around it, giving it a substantially Y shape in horizontal section, as shown in Fig. 9. It is also provided with a pipe connection 21 at the bottom, as shown in Figs. 2 and 7. All these pipe connections are screw-threaded to receive unions for making connection with the lines of pipe. The connections 18—19 lead to train pipes 18ª—19ª for dumping the car at one side or the other, the connection 18 representing the right-hand dumping line and the connection 19 the left-hand dumping line. The connection 20 goes to the exhaust pipe 20ª, while the connection 21 goes to the pipe 15 coming from the main reservoir 13, as shown in Fig. 1.

22, 23, 24 and 25 indicate chambers in the valve body, which communicate, respectively, with the connections 18, 19, 20 and 21,—said chambers being formed by vertical partitions 26, 27, 28 and 29 in the valve body, as also shown in Fig. 9.

30 indicates a web or plate which extends over the several chambers 22 to 25, as shown in Figs. 10 and 12, and is provided with ports 31, 32, 33 and 34 arranged respectively over said chambers.

35 indicates a valve disk, which is adapted to fit upon the valve body so as to overlie the several ports 31 to 34, as shown in Fig. 7. Said disk is provided on its under side with two segmental grooves or channels 36—37 separated by a cross-partition 38, as shown in Figs. 3, 4 and 5. On its upper side said disk is provided with lugs 39—40 spaced apart to receive a key or stem 41, as shown in Fig. 7, so that it may readily be rotated. The passages 36—37 extend through arcs of approximately one hundred and fifty degrees each and are consequently separated by segments of the partition 38 which extend through arcs of about thirty degrees each, as shown in Fig. 8.

40$^a$ indicates an orifice in the disk 37 for admitting compressed air above said disk and equalizing the pressure thereupon.

42 indicates a cap, which fits upon the valve body 17, as shown in Fig. 7, and is secured thereto by a union 43, as shown in Figs. 2 and 7, both the valve body 17 and the cap 42 being provided with screw-threaded flanges 44—45, respectively, to receive said union.

46 indicates a stuffing-box for packing the stem 41, which extends up through the cap and is provided with an operating lever 47, best shown in Figs. 2, 6 and 11. As therein shown the lever 47 is mounted upon the squared upper portion of the stem 41 and is provided with a spring-operated latch 48 which engages notches 49 in a locking bracket 50 mounted on and secured to the cap, as shown in Fig. 1. Said bracket is semicircular in form and is provided with notches at the proper points so that the valve stem may be turned to the desired position and locked there.

It will be apparent from the foregoing description and an examination of the several ports and chambers in connection with the valve disk 35 that compressed air entering the inlet chamber 25 may, when the port 34 is open, pass through said port, through the overlying passage 36 or 37, as the case may be, and into the right-hand or the left-hand dumping line, depending upon which one of said lines is connected with the inlet chamber. For example, assuming that the valve disk 35 is turned so as to cause the passage 36 to overlie the inlet port 34 and to connect said port with port 31 of chamber 22 which leads to the right-hand dumping line, compressed air would accordingly be admitted from the main reservoir 13 to the right-hand dumping line. At the same time port 32 of the left-hand dumping line would be connected by the passage 37 in the valve disk 35 with the exhaust port 33. In like manner the left-hand dumping line could be connected with the main reservoir and the right-hand dumping line connected with the exhaust port. Ports 31 and 32 of both the right and left hand dumping lines may be simultaneously connected with inlet port 34 by turning valve disk 35 into position to cause passage 36, for example, to overlie all three of said ports. Again, by turning valve disk 35 into position to cause the segments 38 to overlie inlet and exhaust ports 34—33, both said ports may be closed and the air in both the dumping lines can be confined in the dumping lines. If desired, by closing the valve or cock 16 the main reservoir may be entirely cut off from the dumping lines and engineer's valve.

The advantages of the construction described are that the engineer has not only complete control of the dumping operations by means of a single valve, but also he is able to economize his air consumption. For example, after the load has been dumped—at which time the train pipe at one side contains air under pressure, while the train pipe at the other side does not—instead of exhausting the compressed air from the former train pipe the engineer closes valve 16 to cut off the supply of air from the main reservoir and then operates his valve 14 to connect ports 31 and 32 leading to the two train pipes. The air under pressure in one of the train pipes is therefore permitted to expand into the other train pipe until the pressure in both is equalized. By then adjusting the valve so as to connect the line which was used to dump the car with the exhaust said line is relieved from pressure while sufficient pressure is retained in the other line to restore the car bed to its normal position, thus economizing very materially in the air consumption.

While my improved valve is intended particularly for use in connection with dump cars, it may be used for any other purpose to which it is adapted, and any other suitable gas may be employed instead of compressed air. The claims, therefore, are to be construed accordingly.

That which I claim as my invention, and desire to secure by Letters Patent, is,—

1. In a dump-car controlling-apparatus, the combination of means for supplying compressed air, dumping lines communicating therewith for dumping the cars at either side, and means for connecting said dumping lines together to admit compressed air from one to the other and for exhausting the air from one line while retaining it in the other.

2. A controlling valve for dump cars having connections with a source of supply of compressed air and dumping lines for dumping the car at either side, and means for connecting the dumping lines together to admit compressed air from one to the other and for exhausting the air from one line while retaining it in the other.

3. A controlling valve for dump cars having connections with a source of supply of compressed air and dumping lines for dumping the car at either side, and means for connecting the dumping lines together to admit compressed air from one to the other and for exhausting the air from one line while retaining it in the other, in combination with means for cutting off the supply of compressed air from said dumping lines.

4. A controlling valve for dump cars having connections with a source of supply of compressed air and dumping lines for dumping the cars at either side, an exhaust outlet, and means for connecting the dumping lines together leaving both disconnected from the exhaust outlet or for connecting either of said dumping lines with the compressed air supply and the other with the exhaust outlet.

5. A controlling valve for dump cars having connections with a source of supply of compressed air and dumping lines for dumping the car at either side, an exhaust outlet, a valve disk having passages adapted to connect either of said dumping lines with the compressed air supply and the other with the exhaust outlet, and means for rotating said valve disk.

6. A controlling valve for dump cars, comprising a valve body having a pair of chambers communicating with dumping lines, ports communicating with said chambers, respectively, an inlet port between and adjacent to said first-mentioned ports, and a valve disk having a passage adapted to overlie all of said ports for connecting the same together.

7. A controlling valve for dump cars, comprising a valve body having a pair of chambers communicating with dumping lines, ports communicating with said chambers, respectively, an inlet port between and adjacent to said first-mentioned ports, and a valve disk having a passage adapted to overlie all of said ports for connecting the same together, in combination with an air reservoir, and means for cutting off said valve from said reservoir.

THOMAS R. McKNIGHT.

Witnesses:
H. D. HAMPER,
W. S. ENDERICH.